Jan. 10, 1950 — L. E. BACHMAN — 2,494,154
SELF-CLEANING RAKE
Filed Nov. 14, 1947 — 2 Sheets-Sheet 1
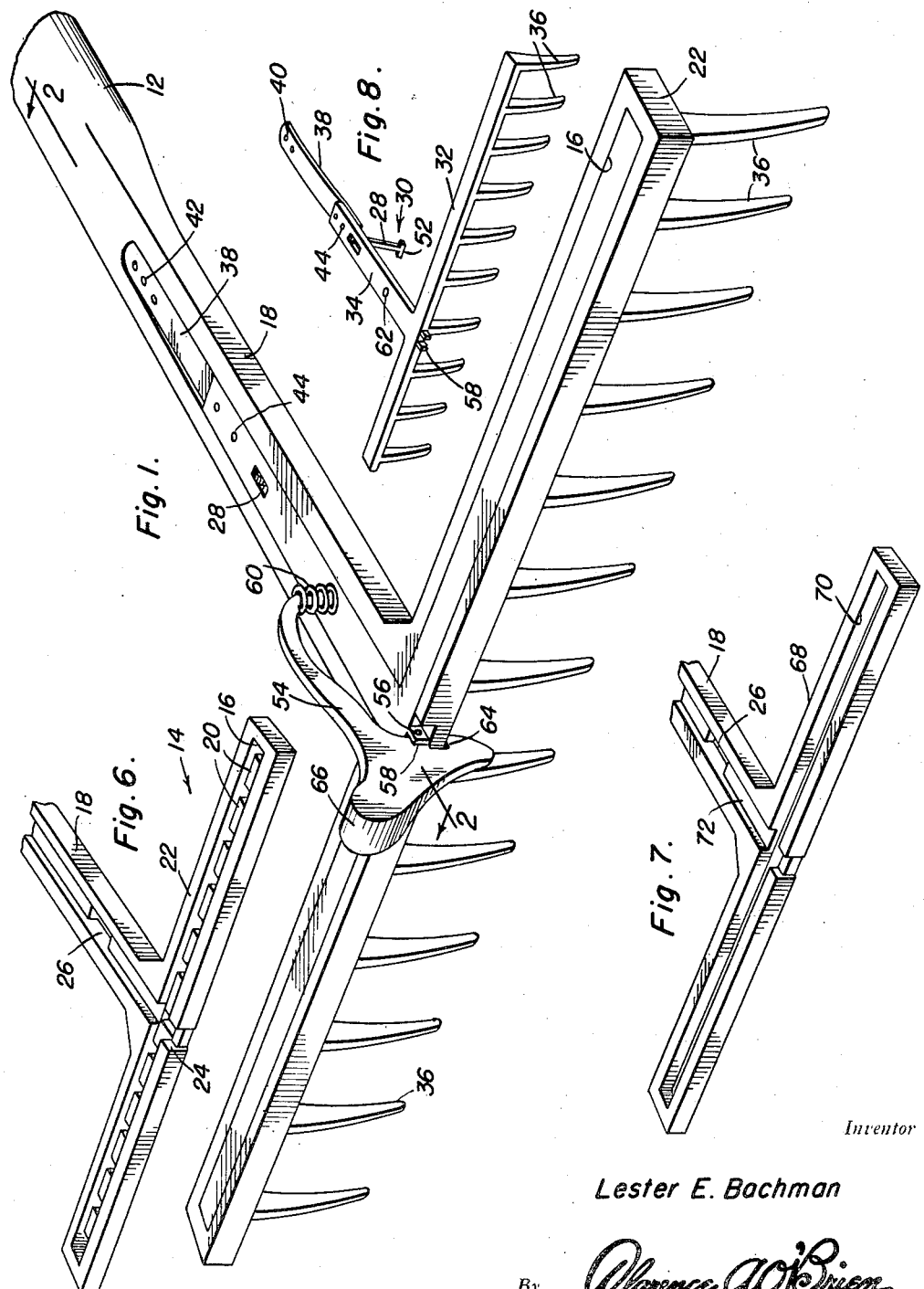
Inventor
Lester E. Bachman
By Clarence A. O'Brien and Harvey B. Jacobson
Attorneys Jan. 10, 1950 L. E. BACHMAN 2,494,154
SELF-CLEANING RAKE
Filed Nov. 14, 1947 2 Sheets-Sheet 2
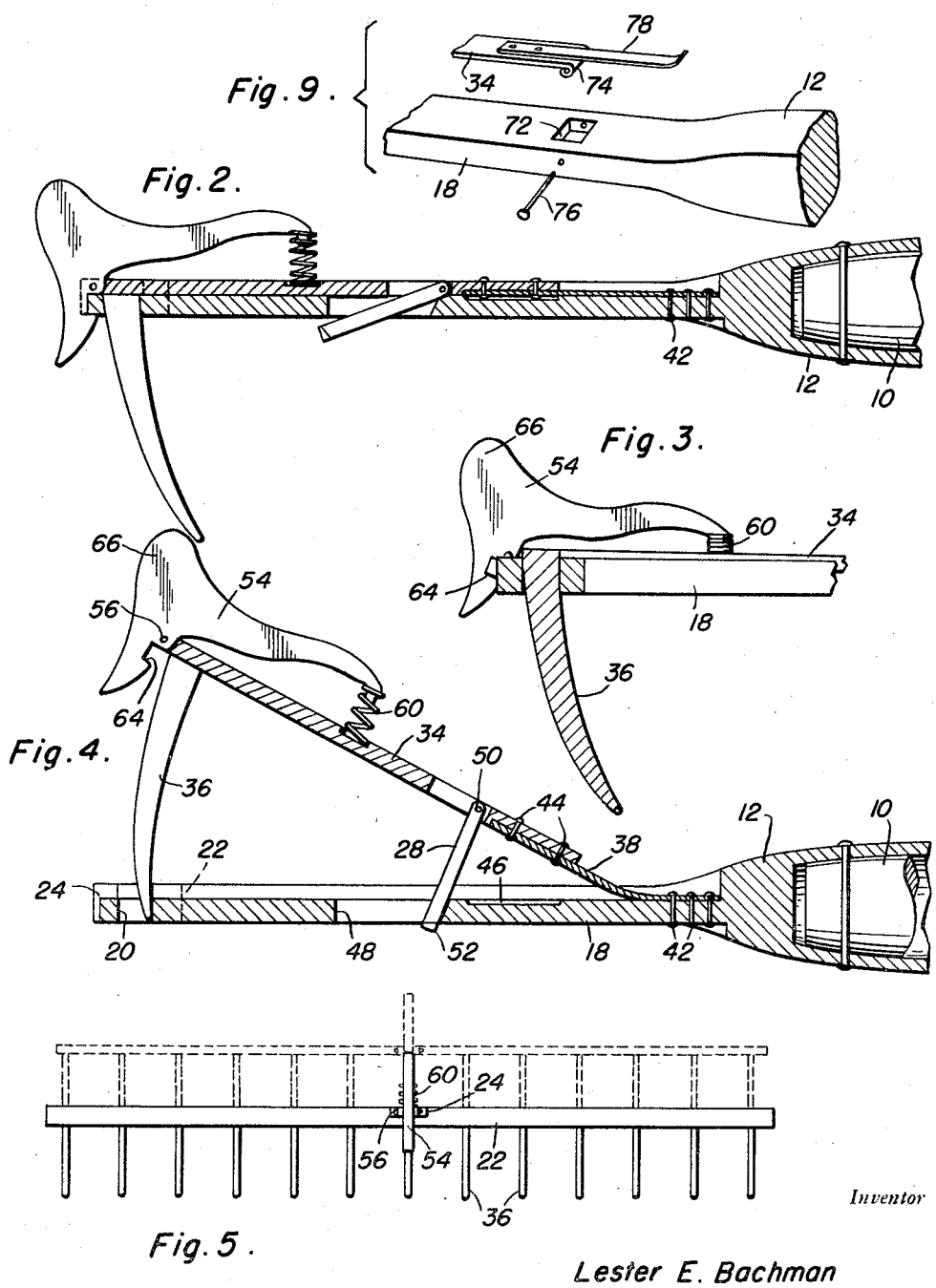
Inventor
Lester E. Bachman Patented Jan. 10, 1950

2,494,154

UNITED STATES PATENT OFFICE 2,494,154

SELF-CLEANING RAKE

Lester E. Bachman, South Ozone Park, N. Y., assignor of one-half to Mary G. Bachman, South Ozone Park, N. Y.

Application November 14, 1947, Serial No. 786,019

4 Claims. (Cl. 56—400.08)

1

This invention relates generally to hand rakes, more particularly to a hand rake which is adapted to be self-cleaning.

It is well understood that several hand rake constructions have been developed and patented, in which means are incorporated for the cleaning of the tines periodically. Therefore, such constructions are not claimed broadly, the instant application relating to certain definite refinements and improvements in the structure of said rakes, whereby the general efficiency of performance of these rakes is improved.

A primary object of this invention is to provide a self-cleaning hand rake construction, in which the rake head is pivotally mounted in a T-shaped member rigidly secured on the handle of the rake, the rake head being normally recessed within this T-shaped member and adequately supported thereby while the tool is in use.

Another object of this invention, ancillary to the preceding object, is to provide means whereby the above mentioned rake head may be pivotally withdrawn out of the said recess, thus retracting the teeth or tines from a mass of grass or litter even though this grass or litter is entwined around the teeth, the rake head being unlocked by allowing a knob on a latching member to contact the ground and the resumption of the rake head into normal position being automatic.

Another object of this invention is to provide convenient latching means whereby the rake head may be held in operative position in the above mentioned T-shaped member, and other means which will limit the movement of the rake head relative to the said member, the latter means being completely automatic in operation.

And a last object to be specifically mentioned is to provide a device of this character which is relatively inexpensive and practicable to manufacture, which is extremely simple, safe and convenient to use, and which will give generally efficient and durable service.

With these objects definitely in view, together with other objects which will appear hereinafter, this invention resides in certain novelty in the construction, combination and arrangement of parts and portions as will be hereinafter described in the specification, particularly pointed out in the appended claims, and illustrated in the accompanying drawings which form a material part of this application, and in which:

Figure 1 is a perspective view of the lower portion of a rake with this invention incorporated, the parts being shown in operative position;

2

Figure 2 is a longitudinal vertical sectional view, taken on the line 2—2 in Figure 1, the lower portion of the handle being shown in elevation, and the tines and latch being also shown in elevation;

Figure 3 is a fragmentary view, similar to Figure 2, except that the latch is shown in unfastened position;

Figure 4 is a view similar to Figure 2, but showing the rake head in fully retracted position;

Figure 5 is a front elevational view of the rake, taken as from the left hand side of Figure 2, the figure being on a slightly reduced scale, and the rake head being shown in a second or retracted position in dash lines;

Figure 6 is a perspective view of a portion of the T-shaped member;

Figure 7 is a perspective view of a modified form of this T-shaped member;

Figure 8 is a perspective view of the rake head with its returning spring and the T-shaped stop member used to limit the upward movement of this rake head relative to the T-shaped member; and, Figure 9 is a grouped view of a modified form for the shank portion of the said T-shaped member, and a coacting modified form of shank for the rake head and retracting spring.

Similar characters of reference designate similar or identical parts and portions throughout the specification and throughout the several views of the drawings.

Referring now to the drawings in detail, it will be noted that this rake includes a handle the lower end portion of which is indicated at 10, the handle being ordinarily of simple elongated cylindrical form. A T-shaped member, fragmentarily illustrated in Figure 6, and shown in combination with other elements in other figures of the drawings, is secured to the end 10 of the handle by means of a ferrule 12 which may be formed integral with this T-shaped member which is generally indicated by the numeral 14. The T-shaped member 14 is provided with a vertical longitudinally disposed recess 16 in the upper portion of the transverse part thereof and this recess extends into the top portion of the shank 18 of this T-shaped head member. It will be noted that in the preferred form of this invention, the recess 16 communicates with a plurality of smaller recesses 20 extending vertically through the lower portion of the transverse part 22 of the T-shaped member. The center forward end of the head member 14 is also recessed as at 24 for a purpose hereinafter made clear. The shank 18 has a vertical recess 26 formed therein to receive the shank portion 28 of the stop member 30 which will be hereinafter described.

The rake head which is represented separately from the other structure in Figure 8, is comprised of a transverse member 32, a shank member 34 and a plurality of tines or teeth 36. These teeth or tines are adapted to reciprocate within the recesses 20 when the rake head is pivoted against the action of the spring 38, which spring is apertured as at 40 for securement, as by screws 42, to the shank portion 18. The spring 38 is secured at the forward end thereof to the shank portion 34 of the rake head by rivets 44, and the shank portion 18 is recessed as at 46 to receive the heads of these rivets, if necessary.

An intermediate portion of the shank 34 is apertured as at 48 to receive the shank portion 28 of the stop member 30 which is pivoted, as at 50 to the shank 34, the transverse portion 52 of the stop member engaging the undersurface of the shank 18 when the rake head is pivoted upwardly to the position indicated in Figure 4, with the teeth 36 nearly withdrawn from the apertures 20.

An irregularly shaped latching member 54 is pivoted, as at 56 to forwardly projecting lugs 58 on the rake head. This latching member is provided with a spring 60, the lower end of which seats within a recess 62 in the upper surface of the shank 34, while the upper end of this spring engages a knob on the rear end portion of the latching member. The forward end of the latching member 54 is provided with a lip 64 adapted to engage the forward central under-portion of the shank 18, when the rake head is depressed into position allowing normal use of the rake. A knob 66 is provided on the upper forward portion of the latching member 54 to facilitate the manipulation of the latching member by contact with the ground, as described hereinafter.

The modified form of the T-shaped member, illustrated in Figure 7, embodies a transverse member 68 having a longitudinally disposed recess 70 extending vertically throughout the transverse member. In both forms of the T-shaped member, the shank portion 18 is longitudinally slotted, as at 72, on the upper surface thereof to receive shank portion 34 of the rake head.

In the modified form of this invention, illustrated in Figure 9, the shank portion 18 is formed with a recess 72 in the upper side of an intermediate portion thereof to receive a hinge portion 74 of the shank 34, and a pin 76 is used to pivotally secure the hinge portion 74 within the recess 72, while the spring 38 is replaced in this modified form by a similar flat spring 78, preferably secured to the upper side of the shank 34 and adapted to urge the rake head downwardly to the T-shaped member, since the spring contacts the rear upper portion of shank 18.

The operation of this invention will be clearly understood from the foregoing description of the mechanical details thereof, taken in connection with the above recitation of the objects sought to be achieved by this invention. In recapitulation, it will be noted that in the preferred or first described form of this invention, as well as in the modified form described immediately above, the rake head is pivoted upwardly manually against the action of the spring 78 after the latching member 54 is released and the spring returns the rake head to normal position. In each case, grass or litter which has gathered upon the tines or teeth 36 is brushed off the tines by the action of the recessed T-shaped member when the rake head is retracted or pivoted upwardly therefrom. Ordinarily, the operator of the rake will allow the knob 66 to contact the ground at the end of a raking stroke, thus releasing the rake head. Thereafter, pressure applied to the rake handle 12 forces the rake head out of its recess. In this way, the problem of cleaning the rake is greatly facilitated and accelerated. It will be obvious that all of the objects recited above are amply attained by this invention but that minor variations in the details of construction and the proportionment of the various parts may be resorted to without departure from the spirit and scope of this invention. Accordingly, limitation of this invention should be only in accordance with a proper interpretation of the appended claims.

Having described the invention what is claimed as new is:

1. A hand rake comprising an elongated handle, a T-shaped head member having the shank portion thereof secured to one end of the handle, a vertical longitudinally disposed recess in said head and extending into the top portion of said shank portion, a rake head having a shank portion and configured to fit within said recess, and a pivotal connection between said shank portion of the head member and said shank portion of said rake head, said pivotal connection comprising a flat spring normally biasing the rake head downwardly, and a latch for releasably fastening the rake head in down position, said latch being spring-biased into latching position and being mounted on the rake head remote from said handle so that the latch can be released by allowing the same to engage the ground.

2. A hand rake comprising an elongated handle, a T-shaped head member having the shank portion thereof secured to one end of the handle, a vertical longitudinally disposed recess in said head and extending into the top portion of said shank portion, a rake head having a shank portion and configured to fit within said recess, and a pivotal connection between said shank portion of the head member and said shank portion of said rake head, said pivotal connection comprising a flat spring normally biasing the rake head downwardly, and means for releasably fastening the rake head in down position, said means comprising a spring operated latch carried by said rake head and engageable with said T-shaped head member.

3. A hand rake comprising an elongated handle, a T-shaped head member having the shank portion of the head member secured to one end of the handle, a vertical longitudinally disposed recess in said head and extending into the top portion of said shank portion, a rake head having a shank portion and configured to fit within said recess, and a pivotal connection between said shank portion of the head member and said shank portion of said rake head, said pivotal connection comprising a flat spring normally biasing the rake head downwardly, and means for releasably fastening the rake head in down position, said means comprising a spring operated latch carried by said rake head and engageable with said T-shaped head member, and means to limit the upward movement of said rake head.

4. A hand rake comprising an elongated handle, a head member having a recess and a shank portion, said shank portion being secured to one end of the handle, a rake head pivoted on said head member with the tines of the rake head oscillatable within said recess, a spring biasing said rake head into normal operative position, said rake head and member being arranged to allow levering pressure on the handle with the rake head contacting the ground to pivot said rake head relative to said head member, a latching member to releasably hold the rake head in said operative position, and means associated with said latching member adapted for releasing said latching member on contact thereof with the ground.

LESTER E. BACHMAN.

REFERENCES CITED

The following references are of record in the file of this patent:

UNITED STATES PATENTS

| Number | Name | Date |
|---|---|---|
| 1,112,787 | Glover | Oct. 6, 1914 |
| 1,118,548 | Gura | Nov. 24, 1914 |